(12) United States Patent
Weedon et al.

(10) Patent No.: US 7,976,930 B2
(45) Date of Patent: *Jul. 12, 2011

(54) NON-FIBROUS HIGH MODULUS ULTRA HIGH MOLECULAR WEIGHT POLYETHYLENE TAPE FOR BALLISTIC APPLICATIONS

(75) Inventors: Gene C. Weedon, Richmond, VA (US); Kenneth C. Harding, Midlothian, VA (US); Lisa Owen, Charlotte, NC (US)

(73) Assignee: BAE Systems Tensylon H.P.M., Inc., Monroe, NC (US)

( * ) Notice: Subject to any disclaimer, the term of this patent is extended or adjusted under 35 U.S.C. 154(b) by 1032 days.

This patent is subject to a terminal disclaimer.

(21) Appl. No.: 11/821,659

(22) Filed: Jun. 25, 2007

(65) Prior Publication Data

US 2008/0318016 A1 Dec. 25, 2008

(51) Int. Cl.
*B29C 65/00* (2006.01)
*B32B 37/10* (2006.01)
*B32B 37/22* (2006.01)

(52) U.S. Cl. ............ 428/156; 139/383 R; 156/164; 156/194; 156/304.6; 428/107; 428/213; 428/364; 442/135

(58) Field of Classification Search .......... 428/156, 428/107, 213, 212, 364; 139/383, 383 R; 429/144; 156/164, 194, 304.6
See application file for complete search history.

(56) References Cited

U.S. PATENT DOCUMENTS

| 5,200,129 A | 4/1993 | Kobayashi et al. |
| 5,578,373 A | 11/1996 | Kobayashi et al. |
| 6,951,685 B1 | 10/2005 | Weedon et al. |

FOREIGN PATENT DOCUMENTS

EP 1627719 A1 * 2/2006

* cited by examiner

*Primary Examiner* — Brent O Hern

(57) ABSTRACT

A non-fibrous ultra high molecular weight polyethylene tape having a width of 1-inch or greater and a modulus of 1,400 grams per denier or greater. The non-fibrous UHMWPE tape is obtained by compression molding ultrahigh molecular weight polyethylene powder at a temperature below its melting point and then drawing and stretching the entire resultant compression molded UHMWPE sheet, with no slitting or splitting of the sheet, at a draw ratio of at least 100:1. The UHMWPE tape can be produced in weights of 6,000 to 90,000 denier or greater. The UHMWPE tape of the present invention minimizes the effect of stress concentrators that are prevalent with fibers and thereby enables the tape to be drawn at much higher draw ratios than is possible with fibrous UHMWPE. When used in ballistics panels, the high modulus high molecular weight polyethylene tape of the present invention improves ballistic performance by providing enhanced dissipation of the impact energy of a projectile.

7 Claims, 2 Drawing Sheets

NON-FIBROUS HIGH MODULUS ULTRA HIGH MOLECULAR WEIGHT POLYETHYLENE TAPE FOR BALLISTIC APPLICATIONS

FIELD OF THE INVENTION

This invention relates to an ultra high molecular weight polyethylene material and more particularly to a non-fibrous high modulus ultra high molecular weight polyethylene tape.

BACKGROUND OF THE INVENTION

Ultra high molecular weight polyethylene (UHMWPE) fibers are frequently used in the manufacture of ballistic panels. The ballistic panels are typically formed from a plurality of woven or nonwoven sheets of UHMWPE fibers and several sheets are typically stacked together to form a panel with the required projectile stopping power. Typically, the UHMWPE fibers employed in ballistics panels must be fitted very tightly together to form an effective ballistics panel.

Unfortunately, the production of UHMWPE fibers, which are typically formed by a gel-spun process, is a very expensive process. Gel-spun polyethylene fibers are prepared by spinning a solution of ultra-high molecular weight polyethylene, cooling the solution filaments to a gel state, and then removing the spinning solvent. One or more of the solution filaments, the gel filaments and the solvent-free filaments are drawn to a highly oriented state. Gel-spun polyethylene fibers are typically formed by extruding a first solution of polyethylene in a non-volatile solvent and then cooled to form a first gel. The first gels are then extracted with a volatile solvent to form a second gel. The low throughput of the gel-spun process, the high cost of separating and recovering all of the various solvents, and the extra expense of forming the fibers into sheets via weaving or other processes makes polyethylene fibers an expensive option for the production of ballistics panels.

UHMWPE fibers have also been produced by the slitting and fibrillating of sheet material, such as shown in U.S. Pat. No. 5,200,129. This patent discloses polyethylene materials of enhanced orientation characteristics obtained by compression molding ultrahigh molecular weight polyethylene powder at a temperature below its melting point, drawing and stretching the resultant compression molded polyolefin into an oriented film, and slitting and fibrillating the oriented film to produce highly oriented UHMWPE fibers. Although the method shown in U.S. Pat. No. 5,200,129 eliminates the solvent and solvent recovery expense involved with gel-spun products, the resultant fibers must still be formed into a sheet by weaving or a similar process to form layers for ballistics applications.

Additionally, it is well known that UHMWPE fibers, whether gel-spun or slit and fibrillated from sheet material, have inherent defects that negatively affect properties such as the tensile modulus. These defects are a function of stress concentrators or microscopic stress points that result from the narrow fiber thickness and the relatively large surface area of the individual fibers. Although the polyethylene fibers individually may have a substantially high modulus value, when formed into sheets for ballistics panels the stress concentrators along the edges and boundaries of the individual fibers could lead to failure or inadequate performance of a ballistics panel constructed from the fibers.

What is needed therefore is a non-fibrous, high modulus, ultra high molecular weight polyethylene product that eliminates the stress concentrator problems inherent in fibrous ultra high molecular weight polyethylene.

SUMMARY OF THE INVENTION

The invention is a non-fibrous, monolithic, ultra high molecular weight polyethylene tape having a width of 1-inch or greater and a modulus of 1,400 grams per denier or greater. The non-fibrous UHMWPE tape is obtained by compression molding ultrahigh molecular weight polyethylene powder at a temperature below its melting point and then calendering and drawing and the resultant compression molded polyolefin at a total draw ratio of at least 100:1. The UHMWPE tape can be produced in weights of 6,000 denier to 90,000 denier. The UHMWPE tape of the present invention minimizes the effect of stress concentrators and thereby allows the tape to be drawn at much higher draw ratios than is possible with fibrous UHMWPE. When used in ballistics panels, the high modulus high molecular weight polyethylene tape of the present invention provides superior ballistic performance by increasing the dissipation of the impact energy of a projectile.

OBJECTS AND ADVANTAGES

The non-fibrous, high modulus UHMWPE tape of the present invention includes several advantages over the prior art, including:

(1) The UHMWPE tape of the present invention enables the production of a UHMWPE product with higher properties, such as tensile strength and modulus, than can be obtained from the processing of fibers of UHMWPE. The is a result of the small incidence of stress points along the edges of the tape of the present invention as compared to the large incidence of stress points along the edges of multiple filament fibers or fibers fibrillated from narrow sheets. The small incidence of stress points along the edges of the current tape product has negligible effect on the breaking strength of the tape. As a result, the tape product of the present invention can be drawn to significantly higher draw ratios and processed under much higher tensions without breaking.

(2) The UHMWPE tape is a monolithic product, formed as a single piece without joints or seams. This monolithic non-fibrous structure leads to significant savings in the production of ballistic laminates as the monolithic structure eliminates stress concentrators that are a significant disadvantage of fibrous UHMWPE.

(3) Stress concentrators or imperfections are greatly reduced with the monolithic tape product of the present invention as a result of the vastly reduced surface area per given length versus UHMWPE fibers. Fibers, consisting of a plurality of individual elements, whether filaments or narrow fibrillated portions, have a large surface area. As a result of their high surface area, fibers include a higher incidence of microscopic stress points or local defects at side chains, terminals, and the like in the molecules and these lead to undesirable variances in break strength and modulus. As a result of the compact, monolithic, sheet structure of the tape material, only the two sides and edges of the tape are exposed, and this leads to a greatly reduced amount of defects per given length versus fibrous UHMWPE.

(4) The tensile modulus is increased significantly over prior art fibers produced from compaction of UHMWPE powder because, with the processing of tape versus fibers, more stringent drawing conditions can be applied to the UHMWPE.

(5) The weight range is increased significantly over prior art fibers produced from compaction of UHMWPE powder, including deniers of 6,000 to 90,000 and even higher. Prior art UHMWPE processes were limited to the production of fibers, with typical weights of 700 or 1,000 denier. The weight range of high modulus UHMWPE is extended substantially by the UHMWPE product of the present invention. The higher weights available in the present invention enable significant savings in the production of ballistic laminates as a single tape of, for example, 19,000 denier can replace approximately 19 fibers of nominally 1,000 denier each. In producing a ballistic laminate, the current product therefore eliminates the necessity of loading a large number of packages of fibers in a creel, spreading the fibers out evenly, applying adhesive to the fibers, and processing the fibers into a laminate.

(6) The smooth surface area of the high modulus tape product of the present invention enables a greater polyethylene to adhesive ratio in ballistics panels than is available with ballistics panels formed from fibrous UHMWPE. The vastly greater surface area per layer of UHMWPE material within ballistics panels formed from fibers, as a result of the fibers and the voids between the fibers created by the woven or nonwoven construction, requires a higher amount of adhesive to bind the separate fibrous layers together. Higher adhesive ratios reduce the effectiveness of ballistics panels, as the adhesive portion does not contribute to the modulus of the product.

(7) The UHMWPE tape of the present invention does not include oils or similar surface treatments to be produced and processed into ballistics products. Polyethylene fibers must be coated with oils or similar treatments in order to be conveyed, wound onto bobbins, and processed into sheets for use as ballistic products. The absence of oils and similar surface treatments on the polyethylene tape of the present invention enables better bonding to adhesives in the production of ballistics panels. Adhesive bonding in fibrous polyethylene is potentially compromised by the surface treatments applied thereto.

(8) The polyethylene tape of the present invention, having been drawn to a ratio of at least 100:1, has a non-permeable surface. The non-permeable surface holds any adhesives on the surface of the tape thereby enabling bonding of sheets with a minimal amount of adhesive.

(9) Fibers must be processed into sheets or fabrics to provide the layer structure required to build a ballistics panel. This adds to the overall cost of the product. The polyethylene tape of the present invention may be simply butted together to form a sheet, bonded together by simply applying pressure to the sides of the sheet, and several sheets bonded together by pressure, pressure and heat, or adhesive and pressure to form a ballistics panels. The polyethylene tape of the present invention eliminates the weaving or other processing step of fibrous UHMWPE and thereby enables the production of ballistics panels at lower cost.

(10) Layers of the tape product of the present invention form a more intimate fit between layers. The polyethylene tape of the present invention has a width of at least 1 inch, which presents two wide flat sides for bonding purposes. Therefore, application of pressure and, if required, some heat, or a light application of adhesive plus pressure is all that is necessary to form a plurality of tapes into a sheet. In contrast, sheets formed by fibers are typically woven and include a large number of interstices as a result of the narrow width of the fibers and the weaving process. A heavy layer of adhesive is typically required to bond fiber sheets together as a result of the adhesive flowing into the interstices. The tape product of the present invention requires pressure and/or heat or a minimal amount of adhesive for bonding sheets than do sheets formed of polyethylene fibers.

(11) The UHMWPE tapes of the present invention can be produced at a much lower unit cost than fibers. Gel-spun fibers require a great deal of processing, including one or more solvents in the gel-spinning process and separation and recovery of those solvents thereby adding greatly to the cost of production. The UHMWPE tape of the present invention is formed directly from UHMWPE powder without the use of solvents. The high modulus UHMWPE tapes of the present invention can be produced at roughly a third of the price of conventional UHMWPE fibers.

These and other objects and advantages of the present invention will be better understood by reading the following description along with reference to the drawings.

TABLE OF NOMENCLATURE

Figure 1:
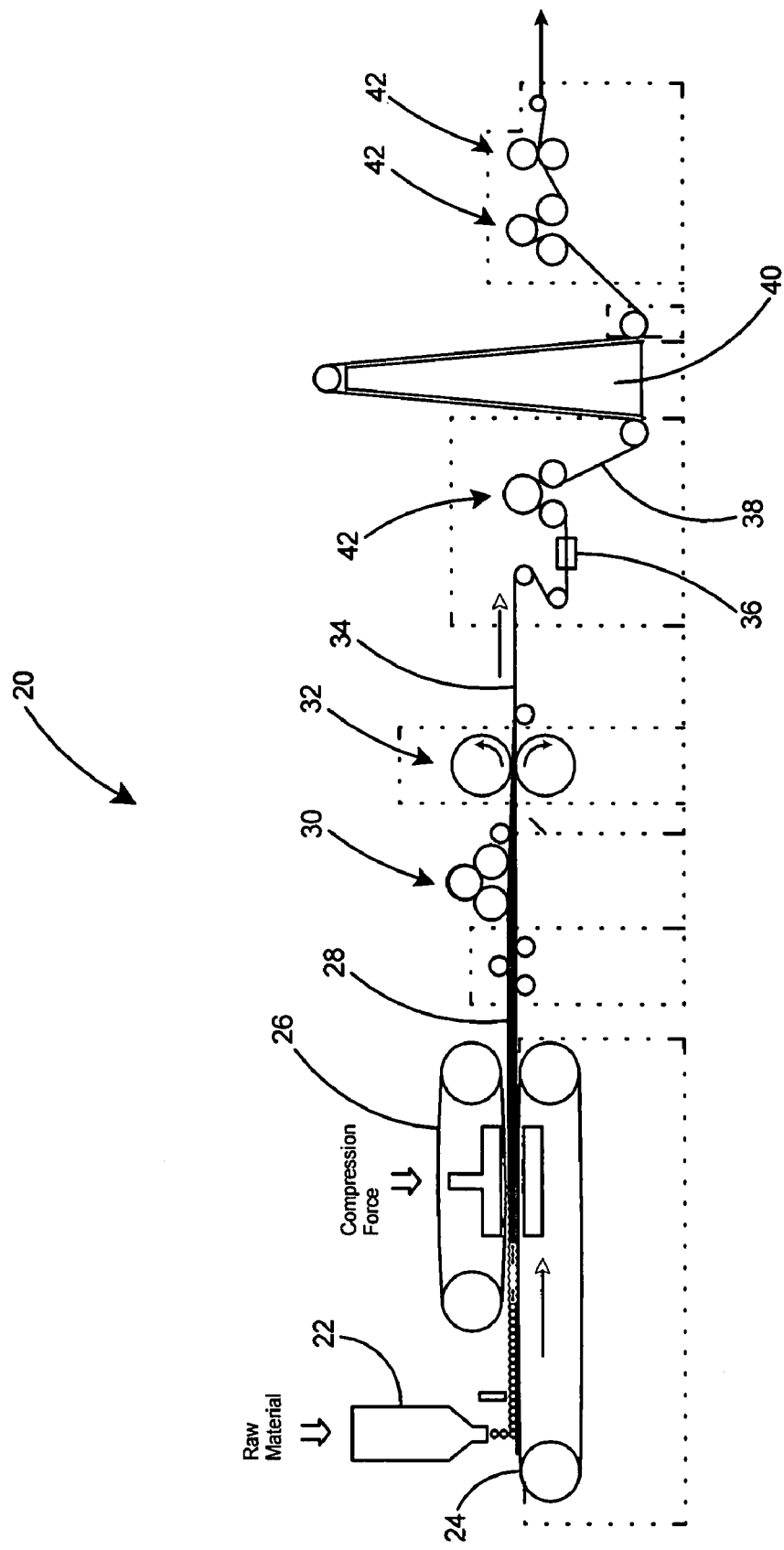
FIG. 1 is a schematic representation of a first portion of a production process for the production of UHMWPE tape according to the present invention.

The following is a listing of part numbers used in the drawings along with a brief description:

| Part Number | Description |
| --- | --- |
| 20 | first portion of UHMWPE tape process |
| 22 | raw material hopper |
| 24 | conveying belt |
| 26 | compaction station |
| 28 | friable UHMWPE sheet |
| 30 | preheater rolls |
| 32 | rolling station or calendering station |
| 34 | calendered sheet |
| 36 | trimming unit |
| 38 | trimmed sheet |
| 40 | first stage drawing unit |
| 42 | pull roll set |
| 44 | super drawing unit |
| 46 | first godet stand |
| 48 | first hot shoe drawing unit |
| 50 | first in-line tension sensor |
| 52 | second godet stand |
| 54 | second hot shoe drawing unit |
| 56 | second in-line tension sensor |
| 58 | third godet stand |
| 60 | nip roll stand |
| 62 | fourth godet stand |

DETAILED DESCRIPTION OF THE INVENTION

With reference to FIG. 1 there is shown a first portion 20 of a process for producing high modulus ultra high molecular weight polyethylene tape with low incidence of stress concentrators according to the present invention. The process for forming the ultra high modulus polyethylene tape includes compression molding of particulate UHMWPE at a temperature below the melting point and subsequent calendering and drawing to produce the high modulus tape. The process includes compacting a very specific class of UHMWPE particles under very carefully controlled temperature conditions to yield compacted sheets, calendering the compacted sheet, and then drawing the calendered sheet at a high draw ratio under careful tension control at a temperature near the onset of the unconstrained melt of the UHMWPE material to produce a high modulus UHMWPE tape. Although the UHMWPE product of the present invention is termed a "tape" herein, the product could also be defined as a film or sheet as it is substantially rectangular shaped and includes a width that is significantly larger than the thickness. The term "tape" as used herein refers to UHMWPE products having widths on the order of at least ½ inch or greater and preferably greater than 1 inch, of a generally rectangular cross-section and having smooth edges and is specifically used to distinguish from the "fiber" UHMWPE products of the prior art that are on the order of ⅛ of an inch wide or narrower and contain a large amount of stress concentrators or microscopic stress points about their edges or periphery. The UHMWPE tape of the present invention includes a width of at least 1.0 inch, a thickness of between 0.0015 and 0.004 inch, and a modulus of 1,400 grams per denier (gpd) or greater. The present invention is a high modulus UHMWPE tape that includes a very high width to thickness ratio, unlike fibrous UHMWPE, which has a width that is substantially similar to the thickness. A high modulus UHMWPE tape according to the present invention, for example, may include a width of 1.0 inch and a thickness of 0.0025 inch, which indicates a width to thickness ratio of 400:1. The UHMWPE tape of the present invention can be produced in weights from 6,000 denier to 90,000 denier and higher. There is no theoretical limit to the width of the high modulus UHMWPE tape according to the present invention, as tape widths of up to 8.1 inches are currently possible and increases in machine sizes could produce even larger width tapes. Similarly, the denier is not limited to 90,000 but could be increased beyond that by larger processing equipment.

As shown in FIG. 1, a raw material hopper 22 introduces a high average molecular weight polyethylene powder exhibiting a high crystallinity and a high specific heat of fusion to a conveying belt 24 that is conveying from left to right in the figure. Preferably, the ultra high molecular weight polyethylene has a viscosity-average molecular weight of 2,000,000 or greater. Compression force is applied at compaction station 26 at a temperature lower than the melting point of the polyethylene. The compression force compacts the polyethylene powder into a friable UHMWPE polyethylene sheet 28 that is conveyed through preheater rolls 30 and then through rolling station 32. The rolling station 32 compresses, shears, and elongates the UHMWPE sheet, thereby orienting and stretching the large UHMWPE molecules. According to the present invention, the UHMWPE particles or powder introduced at the compaction station 26 must exhibit high crystallinity, preferably above 76% as determined by X-ray diffraction, and a heat of fusion equal to or greater than 220 joules/gram as determined by differential scanning calorimetry, to ensure low levels of entanglement downstream of the rolling station 32. Outside of these crystallinity and heat of fusion parameters, the extremely large UHMWPE molecules undesirably entangle or form knots at the discharge of the rolling station 32. Outside of the stated crystallinity and heat of fusion parameters, the UHMWPE cannot be drawn into a smooth sheet but rather is entangled with knots. It is critically important to the successful practice of the present invention that the input starting material particulate UHMWPE possesses the degree of crystallinity and heat of fusion stated herein to meet the low entanglement requirements.

As a result of the compression, shearing, and drawing of the UHMWPE molecules in the rolling station 32, the calendered sheet 34 exits the rolling station 32 in a partially oriented state. As shown in FIG. 1, after the rolling station 32, the calendered UHMWPE sheet 34 enters a trimming unit 36 in which the edges may be trimmed off. The sheet 38 then passes through a first stage drawing unit 40 in which the sheet is drawn at a ratio of between 2:1 to 4:1. At the exit of the first stage drawing unit 40 of the compacting/calendering/drawing process 20 shown in FIG. 1, the UHMWPE sheet has undergone a total draw ratio of between 14:1 and 24:1 and is at a thickness of between 0.0065 and 0.0105 inch. Several pull roll sets 42 are included in the compacting/calendering/drawing process 20 of FIG. 1 for advancing the UHMWPE sheet through the process.

An important difference between the process of the present invention and that described in the referenced prior art relates to the compaction step that is performed on the input UHMWPE material at the compaction station 26 to obtain the product that forms the starting material for the subsequent calendering and drawing steps. According to the preferred fabrication process of the present invention, the compaction step described in the prior art cited hereinabove is performed at a very carefully controlled temperature range. The UHMWPE materials do not exhibit a discrete "melt temperature" in the conventional sense but rather "melt" over a relatively wide temperature range of generally between about 100 to about 143° C. (actual melting in the conventional sense). Hence while the preferred temperature range for compaction is below the melting point of the polymer, compaction can be performed over a temperature range between the onset of melt and melting. Preferably the UHMWPE powder is compacted at a temperature of between 130° C. and 137° C. It should be noted that at higher compaction pressures the operative temperatures for this step can be somewhat lower than those described above. Compression ratios of from about 2:1 to about 4:1 have been found to yield a well formed, compacted sheet. Compaction in these ranges results in the production of a compacted sheet that is of very uniform density and thickness and suitable for further processing in accordance with the method of the present invention. A compacted sheet exhibiting a density of between about 0.85 g/cm$^3$ and 0.96 g/cm$^3$ is preferred as the compacted sheet starting material for the subsequent calendering and drawing processes.

For proper compression, shearing, and drawing to occur in the rolling station 32, the friable UHMWPE polyethylene sheet 28 is preferably first preheated by preheater rolls 30 to a temperature near the onset of melt. Calendering is accomplished by the application of pressure with temperatures preferably near the onset of melt. At the first stage drawing unit 40, drawing is preferably performed at a constant and controlled tension and at a temperature preferably between 140° C. and 158° C. At temperature levels below the previously defined range, drawing of the UHMWPE tape is difficult or impossible or, if drawing occurs, mechanical damage may result in the tape. At temperatures above this range, low tension may result in possible destruction of larger crystals or complete melting and separation of the tape may occur.

Tension control throughout the calendering and drawing steps is important for controlling the thickness of the final UHMWPE product of the present invention. It is preferable to maintain a constant tension of between 0.5 g/denier and 5.0 g/denier to achieve the desired modulus of the final product. At tension levels below 0.5 g/denier drawing will occur but with some loss of modulus, possible melting, or separation of the tape. At tension levels above 5.0 g/denier the tape is susceptible to damage or breakage.

Figure 2:
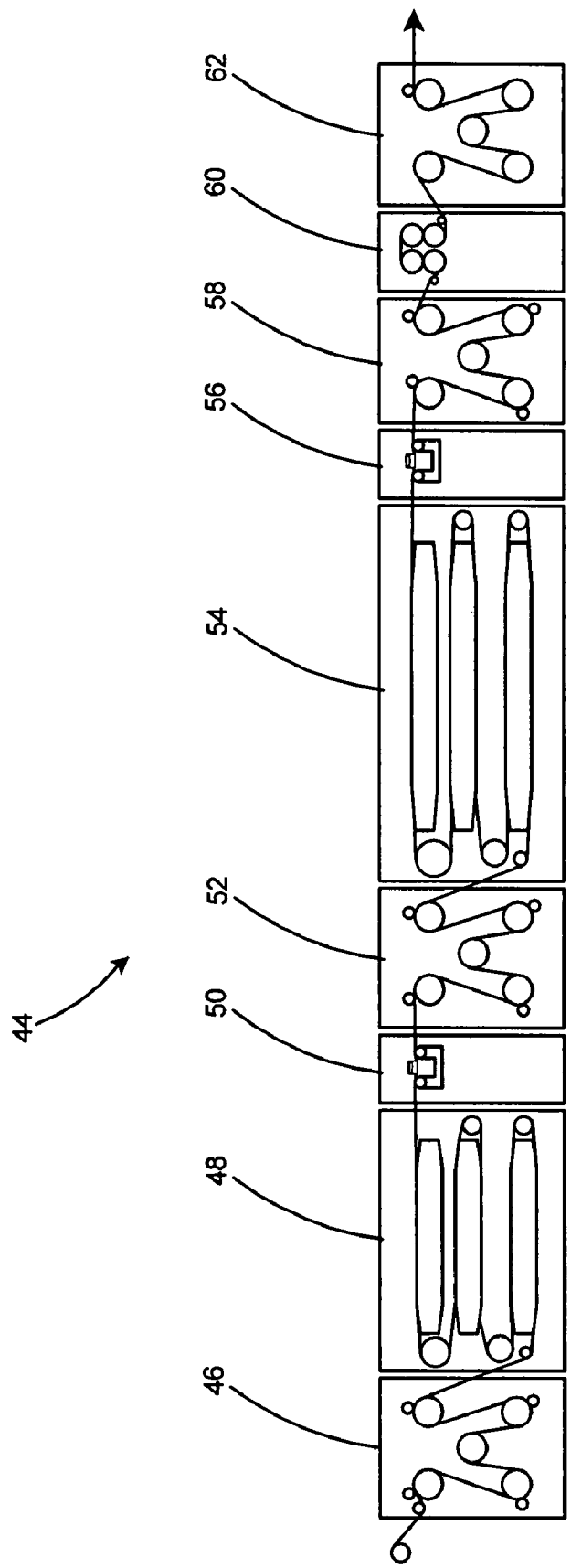
FIG. 2 is a schematic representation of a second portion of a production process for the production of UHMWPE tape according to the present invention.

With reference to FIG. 2, the polyethylene sheet 38 exiting the compacting/calendering/drawing process then enters a super drawing unit 44 in which the sheet 38 is heated to the proper temperature for drawing and then drawn an additional amount of 7:1 or greater. The super drawing unit 44 includes a first godet stand 46, a first hot shoe drawing unit 48, a first in-line tension sensor 50, a second godet stand 52 with all rolls steam heated, a second hot shoe drawing unit 54, a second in-line tension sensor 56, a third godet stand 58 with all rolls steam heated, a nip roll stand 60, and a fourth godet stand 62. At the first 48 and second 54 hot shoe drawing units, the UHMWPE is preferably drawn at a constant and controlled tension and at a temperature preferably between 140° C. and 158° C. The polyethylene exiting the super drawing unit 44 has undergone a total draw ratio of at least 100:1 wherein the draw ratio is defined as the length after stretching divided by the length before stretching, thereby producing a highly oriented ultra high molecular weight polyethylene tape having a modulus of greater than 1,400 gpd. The total draw ratio is a product of the individual draw ratios of each separate drawing stage. As an example with reference to FIGS. 1 and 2, with a draw ratio of 7:1 in the rolling station 32, a draw ratio of 3.6:1 in the first stage drawing unit 40, and a draw ratio of 4:1 in the super drawing unit 44 would equal a total draw ratio of 7×3.6×4 or a total draw ratio of 100:1. The total draw ratio of 100:1 or greater is one critical parameter to meeting the desired molecular orientation and modulus in the final tape product. Hence, the amount of drawing in each individual zone, such as in the rolling or calendering station 32, the first stage drawing unit 40 (see FIG. 1), the first hot shoe drawing unit 48, and the second hot show drawing unit 54, can be varied as desired and will still form the high modulus UHMWPE tape according to the present invention, as long as the overall draw ratio is maintained at 100:1 or greater. The highly oriented UHMWPE tape at the exit of the super drawing unit is maintained at a width of at least 1.0 inch and at a thickness of between 0.0015 and 0.004 inch. The highly oriented UHMWPE tape exits the super drawing unit at speeds of 20 meters/minute (m/min) or greater.

The efficiency of the process for producing high modulus ultra high molecular weight polyethylene tape from the exit of the trimming unit 36 to the final product is quite high, at least 95%, as a result of the tape construction and the resultant minimal amount of breakage. The tape product eliminates stress concentrators and thereby greatly reduces breaks and increases efficiency. The edge trimming is sometimes necessary to remove an uneven edge that is sometimes created at the compaction station 26. If the edge is ragged and left untrimmed, the uneven edge exiting the compaction station 26 would lead to stress concentrators at the edge of the polyethylene tape, and it is desirable to minimize the stress concentrators or microscopic stress points to maximize the performance of the high modulus UHMWPE tape in the final ballistics products.

In contrast to the present process wherein UHMWPE powders are compacted to produce non-fibrous UHMWPE tape, prior art processes including compaction of UHMWPE powders produced UHMWPE fibers that were slit to a width of approximately ⅛-inch. As a result of the production of narrow-width fibers, the fibers process exhibited high amounts of breakage and losses as a result of the high level of stress concentrators along the fiber edges. As a result, the prior art fibers process was subject to a very low efficiency, typically around 72% and the amount of drawing to achieve higher modulus was severely constrained by the narrow width of the ⅛-inch product. The process for producing non-fibrous UHMWPE tape of the present invention therefore increases the efficiency substantially over the prior art fibers processes and enables much higher draw ratios to achieve a higher modulus product.

With reference to FIG. 1, it should be emphasized that, in comparison to prior art UHMWPE produced from compacting polyethylene powders, slitting of the polyethylene sheet is completely eliminated in the present invention. The edge trim, when necessary, is taken to clean up the edge, but there is no slitting of the sheet. The fact that the tape product of the present invention is not slit creates an important distinction of the tape product over all prior art types of ultra high molecular weight polyethylene as all of the prior art UHMWPE products are fibers. When forming butt-jointed sheets of polyethylene tape for use in forming ballistic armor, the joining of 8 tapes of at least 1.0-inch width each would create a nominal 8-inch wide sheet with only 16 edges susceptible to joint defects. Creating an 8-inch wide sheet with fibrous UHMWPE would lead to an extremely high amount of joints susceptible to defects as the entire periphery of each fiber along its entire length would be susceptible to microscopic stress points. A ballistic panel formed of fibrous UHMWPE would therefore be much more prone to joint failure than would a ballistic panel formed of UHMWPE tape according to the present invention.

For a specific example or preferred embodiment of the non-fibrous high modulus ultra high molecular weight polyethylene tape of the present invention, with reference to FIGS. 1 and 2, ultra high molecular weight polyethylene powder having a viscosity average molecular weight of 5,000,000, a crystallinity of greater than 76%, and a heat of fusion of greater than 220 joules/gram, is fed from the raw material hopper 22 with the conveying belt 24 running at 1.3 m/min. A compression force of 25 kgf/cm2 is applied to compress the UHMWPE powder to a compacted friable sheet 28 having a thickness of approximately 0.051 inch. The compacted sheet 28 is heated with preheater rolls 30 and is calendered, compressed, and drawn in rolling station 32. The friable UHMWPE sheet is converted by the rolling station 32 into a partially oriented UHMWPE sheet 34 that has been drawn approximately 6 times (length out is 6 times the length into the rolling station 32). The edges of the partially oriented UHMWPE sheet 34 are then trimmed off at the trimming unit 36 thereby creating a sheet 38 with clean edges. The sheet 38 entering the first stage drawing unit 40 is at a nominal thickness of 0.008 inch, a nominal width of 6.0 inches, and at a speed of 8 m/min. Drawing unit 40 typically draws the UHMWPE sheet an additional 2.5× (2.5 times) adding additional orientation to the polyethylene molecules. The UHMWPE sheet or tape exits the first portion or compacting/calendering/drawing unit 20 of FIG. 1 at a nominal width of 3.5 inches. The super drawing unit 44 of FIG. 2 is currently a separate process in which several ends of tape product from the compacting/calendering/drawing unit 20 of FIG. 1 are further processed. However, the additional product drawing of the super drawing unit 44 could also be performed in line with the compacting/calendering/drawing unit 20 if desired. In the super drawing unit 44 of FIG. 2, three ends of UHMWPE tape of a nominal size of 3.5 inches each are drawn, under carefully controlled tension and carefully controlled temperature, an additional amount to total approximately 120:1 total draw ratio through the processes of FIGS. 1 and 2. The final product exiting the super drawing unit 44 of FIG. 2 is a non-fibrous, highly oriented 19,000 denier UHMWPE tape having a nominal width of 1.62 inches, a nominal thickness of 0.0025 inch, a width to thickness ratio of 648:1, and a tensile modulus of 1,600 grams per denier.

Although in the specific example presented above the denier was 19,000, it should be emphasized that the non-fibrous, highly oriented, high modulus UHMWPE tape of the present invention can be produced in various weights including deniers from 6,000 to 90,000 and higher. Additionally, although specific calender parameters and draw ratios are cited it should be emphasized that the pressure can be varied in the rolling station 32 and the amount of drawing varied among the various drawing stations including at the rolling station 32, first stage drawing unit 40, and at the first 48 and second 54 hot shoe drawing units and still produce the non-fibrous, highly oriented UHMWPE tape of the present invention as long as the total draw ratio is maintained at 100:1 or greater. Additionally, in the specific example cited herein the tape width is cited as 1.62 inches, which is dictated by the specific processing equipment used in the example. It should be noted that the non-fibrous, highly oriented UHMWPE tape can be produced at widths of 8 inches or even larger with properly sized equipment. The width to thickness ratio is preferably at least 400:1.

Having thus described the invention with reference to a preferred embodiment, it is to be understood that the invention is not so limited by the description herein but is defined as follows by the appended claims.

What is claimed is:

1. A monolithic non-fibrous ultra high molecular weight polyethylene tape usable in ballistic resistant panels comprising:
   ultra high molecular weight polyethylene (UHMWPE) having a viscosity-average molecular weight of 2,000,000 or greater;
   a width of from 1.0 to 8.1 inches;
   a modulus of 1,400 to 1,600 grams per denier; and
   a thickness of between 0.0015 and 0.004 inch.

2. The UHMWPE tape of claim 1 wherein said ultra high molecular weight polyethylene is drawn to a total draw ratio of from 100:1 to 120:1.

3. The UHMWPE tape of claim 1 wherein said tape includes a width to thickness ratio of between 400:1 and 648:1.

4. The UHMWPE tape of claim 1 wherein said tape has a denier of from 6,000 to 19,000.

5. The UHMWPE tape of claim 1 wherein said tape is formed from ultra high molecular weight polyethylene powder having
   a crystallinity of at least 76%; and
   a heat of fusion of 220 joules/gram or greater.

6. A non-fibrous and monolithic ultra high molecular weight polyethylene tape usable in ballistic resistant panels comprising:
   ultra high molecular weight polyethylene (UHMWPE) having a viscosity-average molecular weight of 2,000,000 or greater;
   a width of 1.0 to 8.1 inches;
   a modulus of 1,400 to 1,600 grams per denier;
   a thickness of between 0.0015 and 0.004 inch; and
   a denier of 6,000 to 90,000.

7. The UHMWPE tape of claim 6 wherein said tape is formed from UHMWPE powder having
   a crystallinity of at least 76%; and
   a heat of fusion of 220 joules/gram or greater.

* * * * *